Nov. 5, 1957  O. B. McREYNOLDS, JR  2,811,839
EXPLORATION PLUG
Filed Feb. 23, 1950
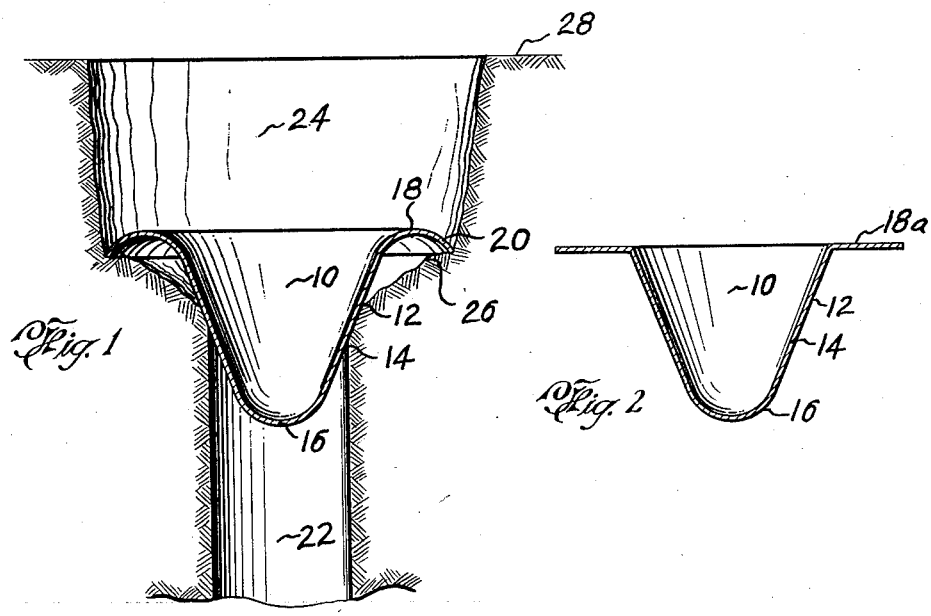
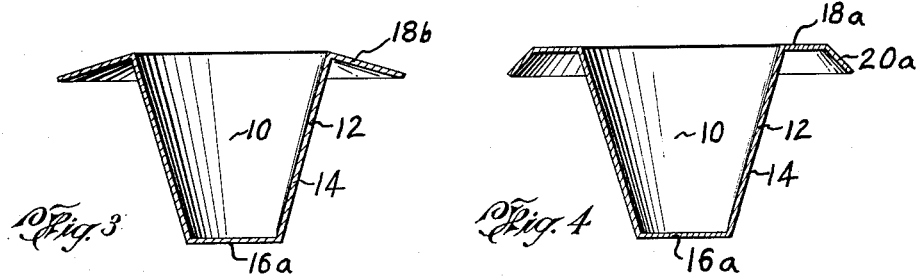
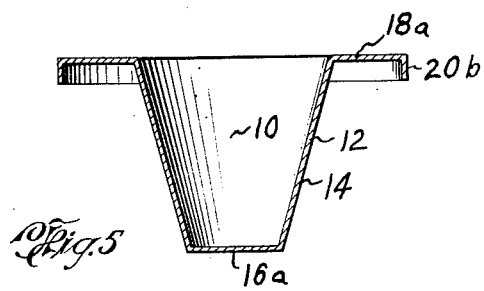
Oliver B. McReynolds, Jr.
INVENTOR.
BY James F. Weiler
ATTORNEY United States Patent Office 2,811,839
Patented Nov. 5, 1957

2,811,839

EXPLORATION PLUG

Oliver B. McReynolds, Jr., Abilene, Tex.

Application February 23, 1950, Serial No. 145,658

7 Claims. (Cl. 61—35)

This invention relates to geophysical and geological exploration and particularly relates to a plug for and method of plugging shot and core holes and the like to prevent erosion thereof and permit ready and easy access thereto for reuse.

In geophysical and geological exploration shot holes are commonly drilled in the ground into which explosives are lowered and detonated and earth vibrations resulting therefrom are recorded and interpreted. Such exploration is conventionally known as seismic prospecting and the shot holes utilized therein may vary from three to five inches in diameter and from 25 to 500 feet in depth, although the diameter and depth may vary considerably under varying conditions. Similarly, core holes may be drilled of varying diameter to varying depths in the exploration of substrata minerals.

In the past these exploration holes have been plugged with rocks, wooden blocks, concrete blocks, flower pots, limbs from trees and the like and in many instances it has been impossible to plug these holes securely to prevent erosion thereof after heavy rainfall in the area of operation. These eroded exploration holes have been the source of considerable damage, claims and payments therefor, lawsuits and injuries to animals and persons. Moreover, many times it is desirable or necessary to reshoot or reexamine a shot or core hole and it has been found upon reexamination of such hole that the plug utilized has sunk 8, 10 or more feet, depending upon local conditions, below its initial anchorage point whereby a large cavity of a diameter of several feet or more is developed from the surface. The danger to animals and persons attendant thereby are manifest, and, moreover, reuse thereof is prevented and it is necessary to drill a new hole. Inasmuch as these exploration holes may vary in depth to and beyond 500 feet, it is apparent that considerable time, manpower and expense is consumed in redrilling such holes. Although the drilling of such holes for exploration purposes has been widespread and of universal practice in the petroleum industry and in the mining of subsurface minerals for twenty or more years, no satisfactory method of or plug for closing such holes has been developed to obviate the noted undesirable conditions.

Accordingly, it is a prime object of my invention to provide a plug which will obviate the above stated undesirable conditions and which will provide an efficient and effective plug for the purposes intended.

It is a major object of my invention to provide an exploration plug to close exploration holes and prevent the latter from becoming eroded due to heavy rainfall and the like.

A still further important object of my invention is the provision of an exploration plug which may be placed in exploration holes and which has two distinct sealing surfaces to engage walls of the exploration hole and prevent erosion thereof.

It is a particular feature of my invention to provide an exploration plug of extremely simple design thereby facilitating and reducing the cost of manufacture and which may be telescoped for transportation purposes and thereby occupy a relatively small space permitting large numbers thereof to be transported to the locations of usage.

It is a particular feature of my invention to provide an exploration plug that is light and strong and which is water and corrosive resistant enabling it to withstand long periods of exposure or use.

A still further feature of my invention is the provision of an exploration plug possessing the above features which may be used to plug a shot or core hole which facilitates the reentrance thereto for additional usage.

Still a further feature of my invention is the provision of an exploration plug that may be firmly anchored in the exploration hole and will not drop materially below the initial position of anchorage thereby facilitating the removal thereof in the event the shot hole or core hole is to be reused and thereby preventing large eroded cavities extending into the subsurface for a considerable distance.

A still further feature and important object of my invention is the provision of an exploration plug which includes a shearable or drillable central member so that in the event the plug cannot be removed from the hole the central portion may be sheared or drilled thereby preventing loss of the exploration hole and permitting reuse thereof.

It is still a further important object of my invention to provide an exploration plug which will effectively seal exploration holes and which may be easily and quickly removed therefrom with a minimum of damage thereto by the use of conventional means.

Other and further objects of my invention will be apparent from the following description of preferred embodiments of my invention taken in connection with the accompanying drawings, where like character references designate like parts throughout the several views, and where—

Fig. 1 is a sectional elevation illustrating the method of placing a preferred form of my invention into an exploration hole to effectively close such hole and prevent erosion thereof, and Figs. 2–5 inclusive are sectional elevations illustrating alternative embodiments of my invention.

Referring to the drawing, and particularly to Fig. 1, the numeral 10 designates my plug which has the conical body portion 12 formed by the downwardly and inwardly tapering sides 14 closed at the lower and small end by the rounded portion 16. The upper and free ends of the sides 14 are upwardly and outwardly bent to form the radial flange 18, which is preferably in the form of a circular segment having the downwardly extending free end 20.

The plug 10 is preferably fabricated from a blank and may be stamped, punched or molded from a metal, metal alloy or a plastic of any desired thickness that will give the required strength to the plug. It is manifest that the simplicity of design facilitates mass production of the plug at an extremely low price. The closed lower end portion 16 is preferably of a shearable material, and preferably the entire plug is of shearable or drillable material so that in the event the plug may not be removed from the bore the end portion may be sheared out with a conventional spear or drilled in order that the exploration hole may be reused.

The method of operation is as follows: In closing an exploration hole such as that indicated by the numeral 22, the upper portion may be enlarged slightly at 24 to provide the substantially axial shoulder 26. This may be accomplished by conventional means, such as by using a shovel, and ordinarily the enlargement should extend one or two feet below the surface 28. The plug 10 may then be inserted into the enlarged portion, and the lower portion 16 will extend into the bore 22, the radial segment 18 anchoring against the upwardly facing shoulder 26 and the tapered sides 14 wedging against substantially axial or slightly inclined walls of the bore 22. The enlarged portion 24 is then filled with dirt or the like and the interior of the plug 10 is completely filled as is the enlarged opening 24. It seems manifest as more weight is placed upon the plug 10 that a tighter seal will be obtained with the walls and shoulder of the exploration hole. Thus rainfall and the like will be directed away from the bore hole 22 by means of the downwardly and outwardly extending flange end 20 thereby preventing seepage of fluid under the radial flange 18 and thereby preventing erosion of the upwardly facing shoulder 26, which in utilizing a conventional plugging means would permit a plug to drop a considerable distance into the bore 22 and thereby provided an enlarged cavity extending to the surface.

If it is desired to reuse or reexamine the exploration hole 22, the dirt closing the portion 24 may be removed with a conventional shovel and the plug 10 easily removed therefrom. The desired reuse may be made of the exploration hole 22 and the plug reinserted therein and the portion 24 filled with earth as previously described. It has been found in practice that in sedimentary deposits the bore 22 will exentually close and provide an additional support for the plug 10; however, with conventional plugs used heretofore the sedimentary deposits permit considerable erosion and consequent dropping of the plug a considerable distance from the surface thereby providing an enlarged cavity at the surface of the ground with consequent and attendant dangers to persons and animals.

Fig. 2 illustrates a modification of my plug in that the radial flange 18a is substantially planar and extends substantially in a transverse direction. All other parts are similar to the preferred form and the manner of use is the same. This particular adaptation, however, is particularly useful in hard formations, such as limestone, in which it would be difficult to anchor a downwardly curving flange as illustrated in the embodiment of Fig. 1. For softer formations, however, the preferred embodiment is more desirable inasmuch as it tends to direct the flow of fluid away from the bore and thereby minimizes the possibility of erosion.

Fig. 3 illustrates a further modification of my plug 10 in which the bottom portion 16a is substantially a planar member extending transversely of the plug and the radial flange 18b extends downwardly and outwardly. All other parts are similar to the preferred embodiment of my invention illustrated in Fig. 1 and the manner of use is similar to that described in connection therewith. This particular modification, however, may be used in both soft and hard formations and adequuate sealing is provided, the radial flange 18b directing erosive substances away from the well bore.

Fig. 4 represents a still further modification of my invention which is similar in some respects to the embodiment illustrated in Fig. 3; however, the planar radial flange 18b extends substantially transversely of the plug and has the depending radial flange 20a extending downwardly and outwardly. All other parts are similar to that described in connection with the embodiment of Fig. 3 and the manner of use is similar with respect thereto and with respect to the method described in connection with Fig. 1.

A still further embodiment of my invention is illustrated in Fig. 5 which is similar in most respects to the embodiment illustrated in Fig. 4. In this embodiment, however, the depending radial flange 20b is disposed axially of the plug 10. All other parts are similar to that illustrated and described in connection with Fig. 4 and the manner of use is similar to that described in connection with Fig. 1.

From the above description it is manifest that many changes may be made within the scope of my invention. For example, the conical body 12 and tapered sides 14 may be in the form of a cylinder and the plug may thus be wedged into the exploration bore 22. From the standpoint of transportation, however, it is preferable to utilize the embodiments illustrated inasmuch as these may be telescoped and consequently occupy a relatively small space thereby permitting large numbers thereof to be transported to the locations of use. Moreover, while the body portions are preferably conical and tapered, such may be multisided and it is only necessary to provide two distinct sealing surfaces, one to the bore and one to the shoulder formed to receive the plug. It is preferable to have the plug formed of a material which is easily drillable and shearable in the event the plug may not be removed thereby preventing loss of the hole.

While I do not intend to be limited to dimensions I have found that a satisfactory plug for exploration holes now being drilled may be approximately 6 inches in length, 3 or less inches in outer diameter at the lower and closed end, approximately 6 inches in internal diameter at the upper and open end with the radial flange extending to approximately 11 inches in diameter. It is preferable to have the closed end small enough to easily and readily extend into the bore 22 and the sides of sufficient taper to wedge against the walls of the bore. The upper flange should provide a seat or anchor for the plug and direct erosive fluids away from the bore.

Accordingly, it is manifest that many changes may be made within the scope of my invention and I do not intend to limit myself to minor details of construction, but only by the scope of the following claims.

I claim:

1. An easily removable exploration plug adapted to close exploration holes whereby erosion thereof is prevented and the hole may be reused for exploration purposes comprising, a hollow body member formed of shearable material closed at one end, upwardly and outwardly tapered sides on such body member adapted to sealingly engage substantially axial walls of such holes, and a substantially planar annulus extending outwardly and downwardly from the upper sides of the body.

2. An easily removable exploration plug adapted to close exploration holes whereby erosion thereof is prevented and the hole may be reused for exploration purposes comprising, a hollow body member formed of shearable material closed at one end, upwardly and outwardly tapered sides on such body member adapted to sealingly engage substantially axial walls of such holes, and a substantially planar annulus extending transversely of the body member from its upper sides and terminating in a peripheral flange extending outwardly and downwardly from the outer periphery of said annulus.

3. The exploration plug of claim 2 where the peripheral flange extends downwardly and substantially axially of the body member.

4. An easily removable exploration plug adapted to close exploration holes whereby erosion thereof is prevented and the hole may be reused for exploration purposes comprising, a hollow body member formed of shearable material closed at its lower end, upwardly and outwardly tapering sides on such body member providing sealing surfaces adapted to sealingly engage substantially axial walls of such exploration holes, the diameter of the lower end of such body being substantially one-half of that of its upper end, and a lateral sealing means extending outwardly from the upper end of the body, said lateral sealing means comprising an upwardly curved annular segment terminating downwardly and outwardly at its free end adapted to sealingly engage annular shoulders formed in such exploration holes whereby upon filling such holes above the plug the respective sealing surfaces are maintained in sealing engagement with said axial walls and such shoulders.

5. An easily removable exploration plug adapted to close exploration holes whereby erosion thereof is prevented and the hole may be reused for exploration purposes comprising, a hollow body member formed of shearable material closed at one end, upwardly and outwardly tapered sides on such body member adapted to sealingly engage substantially axial walls of such holes, and substantially radially and appreciably outwardly extending sealing means on the upper sides of such body, such sealing means including a downwardly and outwardly directed deflecting surface terminating in a downwardly directed free end adapted to dig into a shoulder in such holes upon filling such holes above the plug.

6. An easily removable exploration plug adapted to close exploration holes whereby erosion thereof is prevented and the hole may be reused for exploration purposes comprising, a hollow body member formed of shearable material closed at its lower end, upwardly and outwardly tapered sides on such body member providing sealing surfaces adapted to sealingly engage substantially longitudinal walls of such exploration holes, the diameter of the body member at its lower end being substantially one-half of that of its upper end, a radial flange extending outwardly an appreciable distance from the upper end of such body member, said radial flange terminating in a downwardly extending peripheral flange adapted to dig into a shoulder in such holes upon filling such holes above the plug whereby the sealing surfaces and radial flange sealingly engage said walls and said shoulder.

7. In geophysical or geological exploration of subsurface strata wherein generally circular, viewed in cross-section, exploration holes are bored, the method of closing such holes whereby erosion thereof is prevented and reuse thereof may be made comprising, forming a generally annular shoulder in such holes substantially proximate but slightly below the surface, placing a first sealing surface against the shoulder, placing a second sealing surface against the sides of the hole below the shoulder, such second sealing surface being closed at its lower end and being connected to the first sealing surface, and then filling the hole above the sealing surfaces thereby effecting a seal at the shoulder and with the walls of the exploration holes.

References Cited in the file of this patent
UNITED STATES PATENTS

| | | |
|---|---|---|
| 265,131 | O'Bryon | Sept. 26, 1882 |
| 739,377 | Bell | Sept. 22, 1903 |
| 755,119 | Eckart | Mar. 22, 1904 |
| 789,430 | Jewson | May 9, 1905 |
| 2,109,287 | Elkington | Feb. 22, 1938 |
| 2,577,610 | Deupree | Dec. 4, 1951 |

FOREIGN PATENTS

| | | |
|---|---|---|
| 4,678 | Great Britain | Mar. 29, 1887 |